United States Patent
Marupaduga et al.

(10) Patent No.: US 11,057,882 B1
(45) Date of Patent: Jul. 6, 2021

(54) SYSTEMS AND METHODS FOR DYNAMICALLY SETTING FRAME CONFIGURATION IN A WIRELESS NETWORK

(71) Applicant: Sprint Spectrum LP, Overland Park, KS (US)

(72) Inventors: Sreekar Marupaduga, Overland Park, KS (US); Andrew M Wurtenberger, Olathe, KS (US); Rajveen Narendran, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 15/944,178

(22) Filed: Apr. 3, 2018

(51) Int. Cl.
*H04W 4/90* (2018.01)
*H04W 72/04* (2009.01)
*H04W 88/08* (2009.01)

(52) U.S. Cl.
CPC ......... *H04W 72/0446* (2013.01); *H04W 4/90* (2018.02); *H04W 88/08* (2013.01)

(58) Field of Classification Search
None
See application file for complete search history.

(56) References Cited

U.S. PATENT DOCUMENTS

| | | | | |
|---|---|---|---|---|
| 6,404,388 B1 * | 6/2002 | Sollenberger | ......... | H04W 4/029 342/387 |
| 7,280,828 B1 * | 10/2007 | Shah | ..................... | H04W 48/18 455/433 |
| 9,380,605 B1 * | 6/2016 | Lee | .................... | H04W 74/0833 |
| 9,385,856 B2 | 7/2016 | Ji et al. | | |
| 9,386,608 B2 | 7/2016 | He et al. | | |
| 9,398,609 B2 | 7/2016 | Guo et al. | | |
| 9,654,956 B2 | 5/2017 | Lim et al. | | |
| 9,854,452 B2 * | 12/2017 | Cui | ........................ | H04W 16/10 |
| 10,212,028 B1 * | 2/2019 | Sitaram | .................. | H04L 43/16 |
| 10,225,723 B1 * | 3/2019 | Son | ..................... | H04W 52/281 |
| 10,708,722 B1 * | 7/2020 | Klinkner | .................. | G01S 1/68 |
| 2006/0293074 A1 * | 12/2006 | Bottomley | ......... | H04W 52/247 455/522 |
| 2007/0189047 A1 * | 8/2007 | Lee | .................... | H04W 52/225 363/62 |
| 2007/0237068 A1 * | 10/2007 | Bi | ......................... | H04L 5/0048 370/208 |
| 2010/0029212 A1 * | 2/2010 | Malladi | .................. | H04W 52/10 455/63.1 |
| 2010/0254292 A1 * | 10/2010 | Kim | .................... | H04W 52/346 370/311 |
| 2010/0303022 A1 * | 12/2010 | Maas | .................... | H04L 5/0007 370/329 |

(Continued)

*Primary Examiner* — Nicholas Sloms

(57) ABSTRACT

A system for dynamically setting a frame configuration in a wireless network in an emergency event includes an access node configured to deploy a first radio air interface. The system also includes a plurality of end-user wireless devices attached to the first radio air interface. The system further includes a processor configured to determine a trigger indicating the emergency event associated with one or more of the plurality of end-user wireless devices. The processor is also configured to switch the frame configuration for the access node from a first frame configuration to a second frame configuration, the second frame configuration including more uplink subframes than the first frame configuration.

16 Claims, 10 Drawing Sheets

(56) References Cited

U.S. PATENT DOCUMENTS

| | | | |
|---|---|---|---|
| 2010/0323744 A1* | 12/2010 | Kim | H04W 52/247 455/522 |
| 2011/0009141 A1* | 1/2011 | Harada | H04W 16/14 455/509 |
| 2011/0235582 A1* | 9/2011 | Chen | H04W 52/146 370/328 |
| 2013/0040598 A1* | 2/2013 | Kashiwase | H04W 72/0426 455/404.1 |
| 2013/0040679 A1* | 2/2013 | Kashiwase | H04W 72/04 455/509 |
| 2013/0301490 A1* | 11/2013 | He | H04W 4/90 370/280 |
| 2014/0087736 A1* | 3/2014 | Shoshan | H04W 28/0268 455/437 |
| 2014/0233439 A1 | 8/2014 | Hong et al. | |
| 2014/0334392 A1* | 11/2014 | Gage | H04L 5/0092 370/329 |
| 2015/0063098 A1* | 3/2015 | Yavuz | H04W 24/02 370/229 |
| 2015/0358998 A1* | 12/2015 | Golitschek Edler Von Elbwart | H04W 48/16 370/280 |
| 2016/0021618 A1* | 1/2016 | Yin | H04W 52/146 370/280 |
| 2016/0066304 A1 | 3/2016 | Ji et al. | |
| 2016/0309503 A1* | 10/2016 | Quan | H04W 72/1268 |
| 2016/0353475 A1* | 12/2016 | Au | H04L 5/14 |
| 2017/0019750 A1* | 1/2017 | Palanisamy | H04W 28/0289 |
| 2017/0105221 A1* | 4/2017 | Ahluwalia | H04W 16/14 |
| 2017/0187416 A1* | 6/2017 | Kim | H04L 5/1469 |
| 2017/0195974 A1* | 7/2017 | Huang | H04W 64/00 |
| 2017/0311319 A1* | 10/2017 | Lee | H04L 5/14 |
| 2018/0097541 A1* | 4/2018 | Bhattad | H04L 5/0091 |
| 2018/0152924 A1* | 5/2018 | Ouchi | H04W 48/10 |
| 2018/0220373 A1* | 8/2018 | Arzelier | H04W 4/027 |
| 2018/0302778 A1* | 10/2018 | Wang | H04W 4/90 |
| 2018/0337711 A1* | 11/2018 | Bilotta | H04W 16/14 |
| 2018/0359104 A1* | 12/2018 | Byun | H04W 4/06 |
| 2019/0028962 A1* | 1/2019 | Chun | H04W 76/20 |
| 2019/0246253 A1* | 8/2019 | Ryu | H04W 4/00 |

* cited by examiner

Table 1: Uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

FIG. 10
PRIOR ART

SYSTEMS AND METHODS FOR DYNAMICALLY SETTING FRAME CONFIGURATION IN A WIRELESS NETWORK

TECHNICAL BACKGROUND

A wireless network, such as a cellular network, can include an access node serving a number of end-user wireless devices or user equipment (UE) (hereinafter "wireless devices") in a geographical area covered by the radio frequency transmission of the access node. In some implementations, a wireless network may also include one or more relay nodes providing relay services to one or more end-user wireless devices. Wireless networks are limited by uplink transmissions. Transmitters on the end-user wireless devices are limited to certain specific absorption rate (SAR) levels in order to meet regulatory requirements, such as those imposed by Federal Communications Commission (FCC) in the United States. For example, some end-user wireless devices (e.g., cell phones) currently available on the market may operate at an uplink power level of 23 dB, some may be capable of operating at an uplink power level of 26 dB. When users of the devices are experiencing an emergency event, they may dial an emergency phone number seeking for help (e.g., "911" in the United States), placing the wireless devices in an emergency mode. When the wireless devices are operated in the emergency mode, the uplink transmission power on the wireless devices may be temporarily boosted or increased, for example, from 23 dB to the range of 29 dB to 30 dB. With increased uplink transmission power, the wireless devices may reach an access node at a farther distance. This may be particularly beneficial when the wireless devices are located in a remote area where radio frequency coverage may be poor due to, e.g., insufficient number of access nodes or distance from the access nodes.

When an emergency event (e.g., earth quake, tornado, snow storm, etc.) occurs, a large number of end-user wireless devices may be communicating with federal, state, or local aid organizations. There may be a significant and/or abrupt increase in the amount of uplink data (e.g., voice, video, and/or text data) transmitted from the wireless devices to access nodes via uplink resources of a wireless network served by the access nodes. The increase in the amount of uplink traffic may cause congestions in the uplink channels. Resources allocated for uplink transmission under normal operation conditions of an access node may not be sufficient to meet the abrupt increase in the uplink demand during (or after) an emergency event. Therefore, there is a need for a system and method for dynamically changing uplink resource allocations when an emergency event occurs.

OVERVIEW

Exemplary embodiments described herein include systems, methods, and processing nodes for dynamically setting a frame configuration for an access node in a wireless network in an emergency event. An exemplary system described herein for dynamically setting the frame configuration in a wireless network includes an access node configured to deploy a first radio air interface. The system also includes a plurality of end-user wireless devices attached to the first radio air interface. The system further includes a processor configured to determine a trigger indicating the emergency event associated with one or more of the plurality of end-user wireless devices. The processor is further configured to switch the frame configuration for the access node from a first frame configuration to a second frame configuration, the second frame configuration including more uplink subframes than the first frame configuration.

An exemplary method described herein for dynamically setting a frame configuration in a wireless network in an emergency event includes determining, by a processor, a trigger indicating the emergency event associated with one or more of a plurality of end-user wireless devices. The method also includes switching, by the processor, the frame configuration for an access node from a first frame configuration to a second frame configuration, the second frame configuration including more uplink subframes than the first frame configuration.

An exemplary processing node described herein for dynamically setting a frame configuration in a wireless network in an emergency event is configured to perform operations including determining a trigger indicating the emergency event associated with one or more of a plurality of end-user wireless devices. The operations also include switching the frame configuration for an access node from a first frame configuration to a second frame configuration, the second frame configuration including more uplink subframes than the first frame configuration.

BRIEF DESCRIPTION OF THE DRAWINGS

FIG. 10 depicts exemplary frame configurations number 0 to number 6 per 3GPP standards.

DETAILED DESCRIPTION

Figure 1:
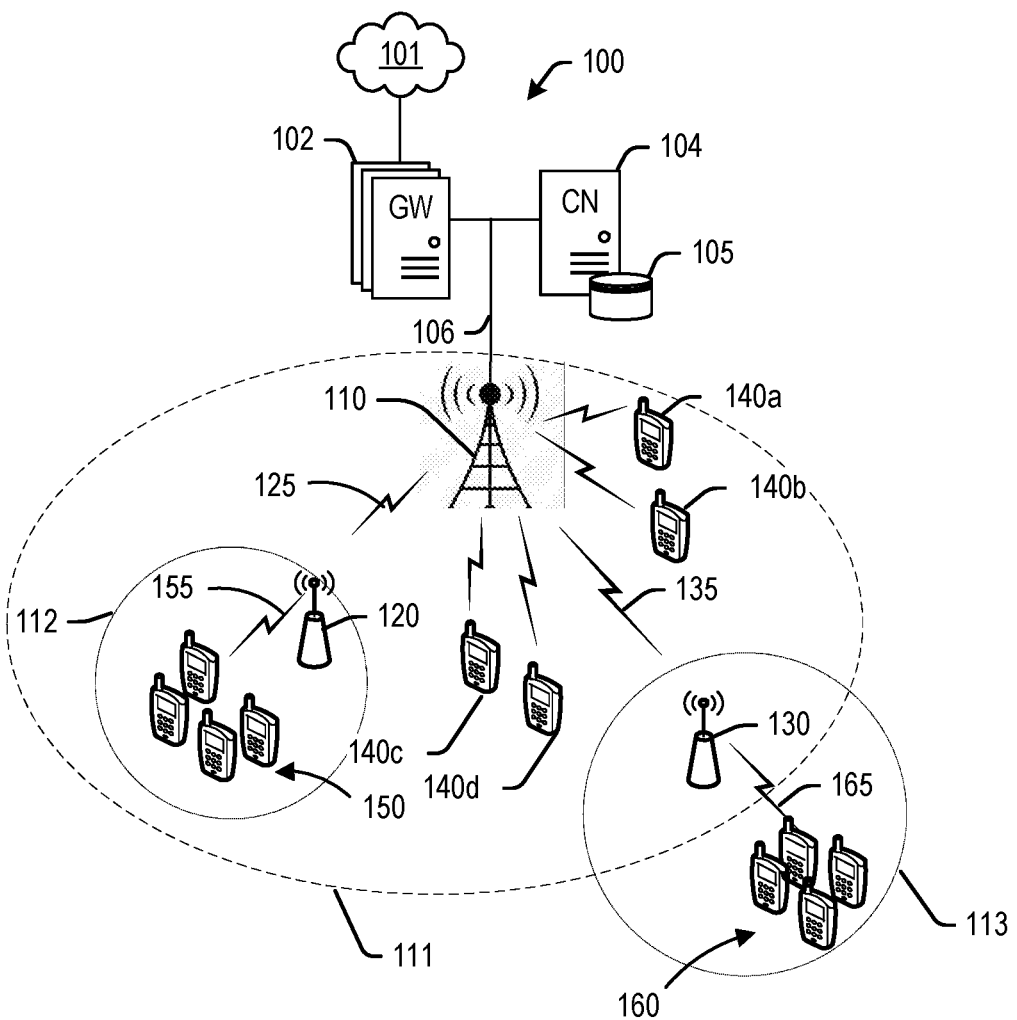
FIG. 1 depicts an exemplary system for wireless communication, in accordance with the disclosed embodiments.

Exemplary embodiments described herein include systems, methods, and processing nodes for dynamically setting a frame configuration for an access node in a wireless network in an emergency event. The term "emergency event" used herein may include any event that is may require a change in the settings (including the frame configuration)

of the access node. For example, the term "emergency event" may include an event related to the weather, natural disasters, public safety, and/or homeland security. Examples of the emergency event may include an earth quake, a tornado, a hurricane, a tsunami, a flood, a snow storm, a landslide, etc. The term "emergency event" may also include other events that may require, justify, or trigger a change in the settings of the access node in a wireless network to improve the quality of downlink and/or uplink transmissions. For example, the emergency event may also include a public gathering, such as a demonstration, a celebration, a sports event, a social event, etc. In such events, a large number of people may use wireless devices within a wireless network served by an access node. A significant increase in the uplink data transmission from the wireless devices may justify or trigger a setting change in the access node, such as a change of the frame configuration in order to improve the quality of uplink transmission. The term "in the emergency event" or "during the emergency event" is used herein to broadly include before, during, and/or after the occurrence of the emergency event.

When an emergency event occurs, a large number of end-user wireless devices may be operated in an emergency mode (e.g., "911" mode in the United States). People may use the wireless devices to transmit uplink data (e.g., voice, text, and/or video data) to the access node. When operated in the emergency mode, the uplink transmission power for the end-user wireless devices may be boosted temporarily, enabling the end-user wireless devices (e.g., those located at the edge of the coverage area) to better communicate with an access node. Although boosting the uplink transmission power may increase the communication distance, the communication channels for uplink may still be congested if the number of uplink subframes in a frame configuration is insufficient to handle the abrupt increase in the uplink transmission.

Under a normal operation condition, the frame configuration for an access node that supports LTE time division duplex (TDD) may be fixed. The term "normal operation condition" used herein refers to the typical, regular operation condition of the access node prior to the occurrence of the emergency event that may trigger the switch of the frame configuration at the access node. For example, under the normal operation condition, the access node may operate at any of frame configuration number 1, 2, 3, 4, or 5, as shown in the uplink-downlink frame configurations Table 1 of FIG. 10, per 3GPP standards (i.e., $3^{rd}$ Generation Partnership Project standards). The number of subframes allocated for uplink in these frame configurations may not be sufficient to meet the abrupt increase in the uplink demand from the end-user wireless devices during an emergency event. The present disclosure addresses this issue by providing systems and methods for dynamically setting the frame configuration for an access node such that an increased number of subframes are allocated for uplink communication during an emergency event. As a result, the quality of uplink communication for the end-user wireless devices may be improved during an emergency event.

An exemplary system described herein includes at least an access node, such as an eNodeB, and a plurality of end-user wireless devices. The system may also include a relay node in wireless communication with the access node and configured to relay data packets between the access node and an end-user wireless device served by the relay node. The term "end-user wireless devices" or "wireless devices" used herein includes both end-user wireless devices that are directly communicating with the access node, and end-user wireless devices that are indirectly communicating with the access node through the relay node.

In a wireless network, such as an LTE TDD network, the access node may provide communication services to the end-user wireless devices according to a frame configuration. A frame may include a plurality of subframes, such as 10 subframes (or any other suitable number of subframes). Each subframe may be designated for uplink transmission, downlink transmission, or as a special subframe for other purposes. A frame configuration refers to the assignments of the subframes for uplink transmission, downlink transmission, or for special purposes (as a special subframe). When end-user wireless devices communicate with the access node according to a frame configuration, uplink data may be transmitted through subframes designated for uplink transmission, and downlink data may be transmitted through subframes designated for downlink transmission. FIG. 10 shows exemplary frame configurations number 0 to number 6, per 3GPP standards. Letter "D" denotes downlink subframes, letter "U" denotes uplink subframes, and letter "S" denotes special subframes.

As shown in FIG. 10, frame configuration number 0 includes 6 subframes allocated for uplink transmission, and 2 subframes allocated for downlink transmission. Thus, frame configuration number 0 has more uplink subframes (and hence resources) than downlink subframes. Frame configuration number 6 includes 5 subframes for uplink transmission and 3 subframes for downlink transmission. Thus, frame configuration number 6 has more uplink subframes than downlink subframes. Frame configuration 1 includes 4 subframes for uplink transmission and 4 subframes for downlink transmission. Thus, frame configuration number 1 has equal numbers of uplink and downlink subframes. Frame configuration number 2 includes 2 subframes for uplink transmission and 6 subframes for downlink transmission. Thus, frame configuration number 2 has fewer uplink subframes than downlink subframes. Frame configuration number 3 includes 3 subframes for uplink transmission, and 6 subframes for downlink transmission. Therefore, frame configuration number 3 has more downlink subframes than uplink subframes. Frame configuration number 4 includes 2 subframes for uplink transmission, and 7 subframes for downlink transmission. So, frame configuration number 4 has more downlink subframes than uplink subframes. Frame configuration number 5 includes 1 subframe for uplink transmission, and 8 subframes for downlink transmission. So, frame configuration number 5 includes more downlink subframes than uplink subframes.

When a frame configuration that has more uplink subframes is used in a network, more resources (e.g., subframes) are allocated for uplink transmission. Such a frame configuration can lead to improved uplink transmission quality, for example, faster speed of uplink transmission. For example, frame configuration numbers 0 and 6 each includes more uplink subframes than downlink subframes. Thus, each of frame configuration numbers 0 and 6 may result in improved uplink transmission quality when compared to frame configuration numbers 1-5.

According to the present disclosure, if a wireless network provided by an access node operates with a first frame configuration under normal operation conditions, then when an emergency event occurs, the access node may switch to a second frame configuration that has more uplink subframes than the first frame configuration. In some embodiments, for example, if under the normal operation conditions the access node uses any one of frame configuration numbers 1-5, when an emergency event occurs, to improve the uplink transmission quality, the access node may switch the frame configuration to any one of frame configuration numbers 0 and 6, which has more uplink subframes than any one of frame configuration numbers 1-5.

In another example, if the frame configuration used under normal operation conditions is frame configuration number 5, which has only 1 uplink subframe, then when an emergency event occurs, the access node may switch the frame configuration from frame configuration number 5 to frame configuration number 0, 1, 2, 3, 4, or 6, each of which having more uplink subframes than frame configuration number 5.

In addition to the systems and methods described herein, the operations for dynamically setting the frame configuration for the access node may be implemented as computer-readable instructions or methods, and processing nodes on the network for executing the instructions or methods. The processing node may include a processor included in an element management system coupled to an access node, a processor included in the access node, or a processor included in any controller node in the wireless network.

FIG. 1 depicts an exemplary system for wireless communication. System 100 may be a wireless communication network, such as a cellular network. System 100 may include a communication network 101, a gateway 102, a controller node 104, and an access node 110. Access node 110 may deploy a first radio air interface serving one or more relay nodes 120 and 130, and one or more end-user wireless devices. One or more end-user wireless devices may be directly connected to access node 110, such as end-user wireless devices 140a, 140b, 140c, and 140d. One or more end-user wireless devices may be indirectly connected to access node 110 through relay nodes 120 and 130, such as end-user wireless devices 150 and 160. Hereinafter, for simplicity, the directly connected and indirectly connected end-user wireless devices are generally referred to as end-user wireless devices or wireless devices.

The wireless devices disclosed herein may be a standard (or low) powered wireless device (LPUE) that may operate at a low uplink power level, such as 23 dB. In some embodiments, the wireless devices disclosed herein may be a high-powered wireless device (HPUE) that may operate at a high uplink power level, such as 26 dB-30 dB. In some embodiments, the wireless devices disclosed herein may have a capacity to operate either in a LPUE mode or a HPUE mode, or switch between the LPUE mode and the HPUE mode. In some embodiments, the wireless devices disclosed herein may have multiple power modes or classes, and may be configured to switch between the multiple power modes or classes.

In the exemplary embodiment shown in FIG. 1, access node 110 may be a macro-cell access node configured to deploy a wireless radio air interface over a coverage area 111. Each of relay nodes 120, 130, and each of end-user wireless devices 140a, 140b, 140c, and 140d may be attached to the wireless air interface deployed by access node 110. Relay nodes 120 and 130 may be configured to communicate with access node 110 over wireless communication links 125 and 135, respectively (hereinafter, "wireless backhaul" or "backhaul"). Wireless links 125 and 135, as well as other wireless links that directly couple wireless devices 104a, 140b, 104c, and 140d with access node 110, as shown in FIG. 1, form the wireless network (or wireless radio air interface) deployed by access node 110 within coverage area 111. Relay nodes 120 130 may be further configured to deploy additional wireless radio air interfaces over coverage areas 112 and 113, respectively. A plurality of wireless devices 150 may be configured to attach to a wireless radio air interface or link 155 deployed by relay node 120, and a plurality of wireless devices 160 may be configured to attach to a wireless air interface or link 165 deployed by relay node 130. All of the wireless devices 150 and 160 are indirectly attached to the wireless radio air interface deployed by access node 110 through relay nodes 120 and 130.

In some embodiments, wireless devices 150 and 160 may access network services using the combination of relay nodes 120 and 130, wireless backhaul links 125 and 135, and access node 110. In some embodiments, wireless devices 140a, 140b, 140c, and 140d may access network services by directly connecting to access node 110. As shown in FIG. 1, wireless devices 160 are illustrated as being located outside of coverage area 111 of access node 110. Wireless devices 160 may access network services provided by access node 110 through relay node 130. In this configuration, access node 110 may be referred to as a "donor" access node. In other embodiments, any other combination of donor access nodes, relay access nodes, and carriers deployed therefrom may be evident to those having ordinary skill in the art in light of this disclosure.

Access node 110 may be any network node configured to provide communication between end-user wireless devices 140a, 140b, 140c, 140d, 150, 160 and communication network 101, including standard access nodes such as a macro-cell access node, a base transceiver station, a radio base station, an eNodeB device, an enhanced eNodeB device, or the like. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120 and 130 may each include a processor and associated hardware circuitry configured to execute or direct the execution of computer-readable instructions to perform operations such as those described herein. In some embodiments, access node 110 and relay nodes 120 and 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120 and 130 may receive instructions and other input at a user interface. Access node 110 may communicate with gateway 102 and controller node 104 via a communication link 106. Access node 110 and relay nodes 120 and 130 may communicate with each other, and other access nodes (not shown), using a wireless link or a wired link such as an X2 link. Components of access node 110 and relay nodes 120 and 130 are further described below.

Wireless devices 140a, 140b, 140c, 140d, 150, and 160 may be any device, system, combination of devices, or other such communication platform configured to wirelessly communicate with access node 110 and/or relay nodes 120 and 130 using one or more frequency bands deployed therefrom. Wireless devices 140a, 140b, 140c, and 140d may be directly communicating with access node 110 without using a relay node, whereas wireless devices 150 and 160 may be indirectly communicating with access node using relay nodes 120 and 130. Each of wireless devices 140a, 140b, 140c, 140d, 150, and 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by wireless devices 150 and 160. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G LTE, or 5G Next Radio (5G NR)). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include Si communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE), or 5G NR, and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120 and 130, resource requirements of end-user wireless devices 140a, 140b, 140c, 140d, 150, and 160, priority levels associated therewith, and so on. The information may be requested by or shared with access node 110 via communication link 106, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein, including operations relating to dynamically setting the frame configuration for the wireless network provided by access node 110. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
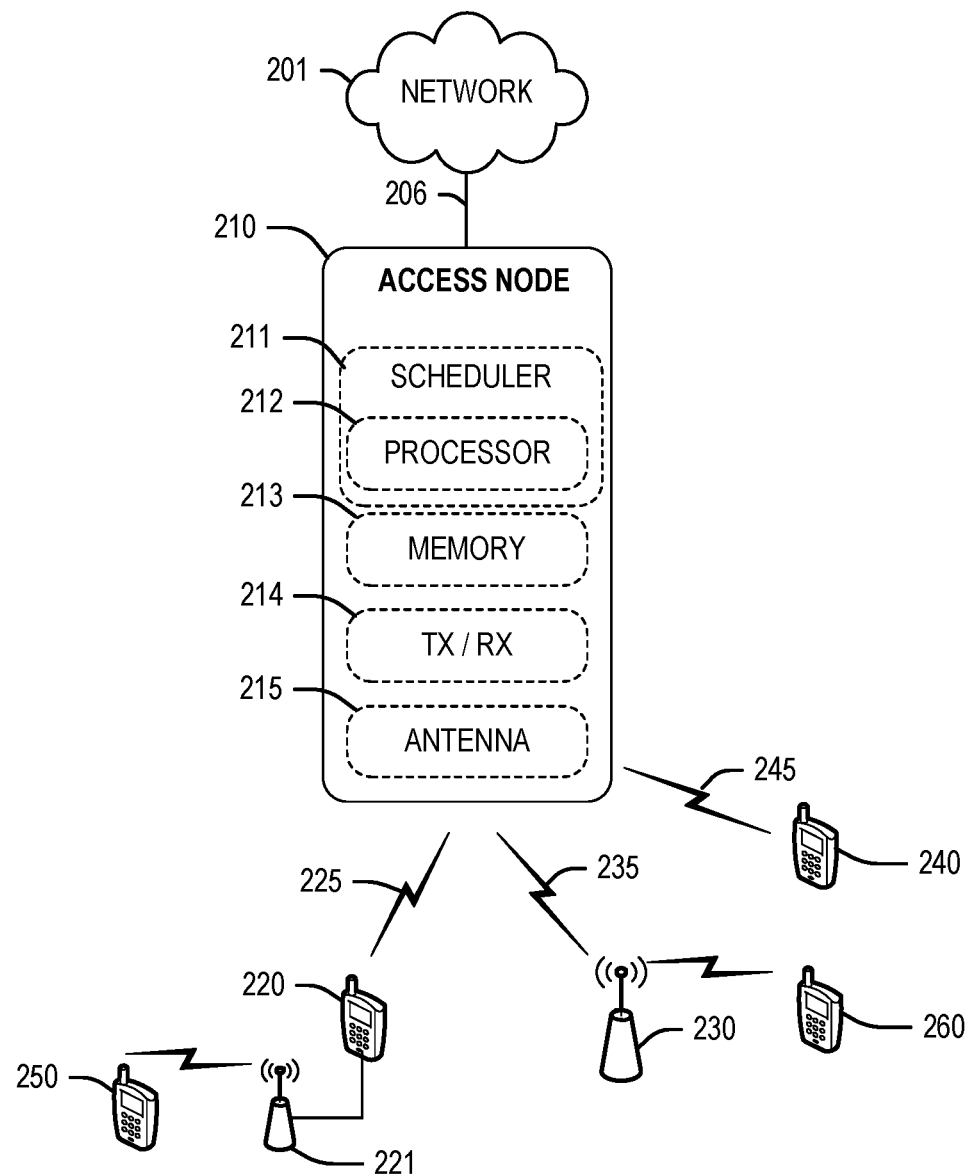
FIG. 2 depicts an exemplary access node, in accordance with the disclosed embodiments.

FIG. 2 depicts an exemplary access node 210. Access node 210 may include, for example, a macro-cell access node. Access node 210 may be an embodiment of access node 110 described with reference to FIG. 1. Access node 210 may include a scheduler 211, which may include a processor 212. Access node 210 may also include a memory 213, a transceiver 214, and an antenna 215. Scheduler 211 may be configured to schedule or allocate resources, including uplink resources, for relay nodes communicatively coupled to access node 210. In some embodiments, processor 212 of scheduler 211 may be configured to execute instructions stored on memory 213 for performing various methods disclosed herein for dynamically setting the frame configuration for the wireless network deployed by access node 210. Transceiver 214 and antenna 215 may be configured to enable wireless communication with a relay wireless device 220, a relay node 230, and an end-user wireless device 240. Relay wireless device 220 may communicate with access node 210 through a wireless link 225. Relay node 230 may communicate with access node 210 through a wireless link 235. End-user wireless device 240 may communicate with access node 210 through a wireless link 240. Wireless links 225, 235, and 245 may form the wireless network (or wireless radio air interface) deployed by access node 210. Instructions stored on memory 213 may be accessed and executed by processor 212 to perform operations disclosed herein, such as deploying a wireless radio air interface (e.g., including wireless links 225, 235, and 245) via one or more of transceiver 214 and antenna 215. The operations performed by processor 212 may also include enabling relay wireless device 220, relay node 230, and end-user wireless devices 240 to access network services from a network 201 via access node 210. Network 201 may be similar to network 101 discussed above. The operations performed by processor 212 may further include enabling relay wireless device 220 to communicate with end-user wireless device 250 and a relay access point 221, and enabling relay node 230 to communicate with end-user wireless device 260 and access node 210. Relay wireless device 220 and relay access point 221 may be referred to as a relay node as well. Although memory 213 is shown as separated from scheduler 211, in some embodiments, memory 213 may be included in scheduler 211. Alternatively, scheduler 211 may include an additional memory. In some embodiments, access node 210 may be referred to as a donor access node.

Figure 3:
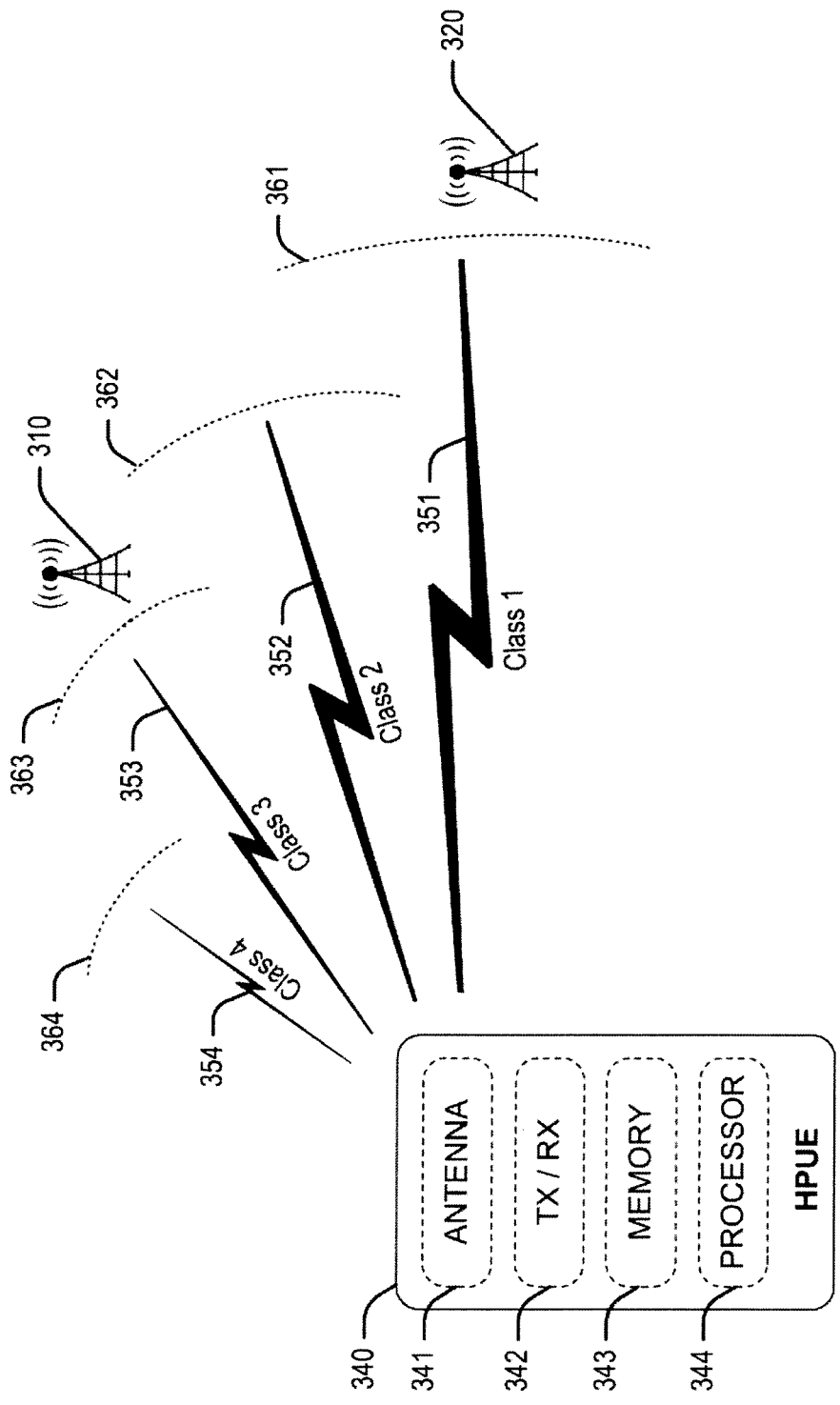
FIG. 3 depicts an exemplary wireless device that is configured to transmit in different power classes to an access node, in accordance with the disclosed embodiments.

FIG. 3 depicts an exemplary wireless device 340 capable of transmission in several power classes. Wireless device 340 may be an embodiment of any of the wireless device depicted in FIGS. 1, 2, and 4. Wireless device 340 may communicate with access node 310 and/or access node 320. Wireless device 340 may include an antenna 341, a transceiver 342, a memory 343, and a processor 344. Wireless device 340 may be configured to operate at as different power classes. For example, wireless device 340 may be configured to operate as a high-powered wireless device (HPUE), or may be configured to operate as a standard or low-powered wireless device (LPUE). In some embodiments, wireless device 340 may switch between an HPUE mode and an LPUE mode.

Wireless device 340 may include an antenna 341 and a transceiver 342. Antenna 341 and transceiver 342 may enable increased transmission power (or uplink transmission power) from wireless device 340 to one or more access node 310, 320. For example, wireless device 340 may be capable of operating in a transmission mode utilizing power class 1, power class 2, power class 3, or power class 4. Fewer or additional power classes may be configurable in wireless device 340 than those depicted in FIG. 3. In some embodiments, wireless device 340 may be manually switched from a low power mode (e.g., power class 4) to a high power mode (e.g., power class 1). In some embodiments, wireless device 340 may automatically switch from a low power mode to a high power mode in case of emergency. For example, when wireless device 340 is placed in an emergency call mode, wireless device 340 may automatically switch from a low power mode to a high power mode. As another example, when wireless device 340 receives a signal relating to an occurrence of an emergency event, e.g., from another wireless device or from an access node, wireless device 340 may automatically switch from a low power mode to a high power mode.

In the embodiment shown in FIG. 3, wireless device 340 may be configured to transmit an uplink transmission 351 to access node 320 at a range 361. Wireless device 340 may switch transmission mode from power class 1 to power class 2 to transmit an uplink transmission 352 at a range 362. In addition, wireless device 340 may switch transmission mode from power class 2 to power class 3 to transmit an uplink transmission 353 at a range 363. Furthermore, wireless device 340 may switch transmission mode from power class 3 to power class 4 to transmit an uplink transmission 354 at a range 364. Wireless device 340 may switch from power class 4 to power class 1.

In some embodiments, wireless device 340 may switch between different power classes sequentially (e.g., from power class 1 to power class 2, from power class 2 to power class 3, from power class 3 to power class 4, and from power class 4 to power class 1). In other words, wireless device 340 may switch between two adjacent power classes. In some embodiments, wireless device 340 may switch from any power class to any other power class, which may not be an adjacent to each other. For example, wireless device 340 may switch from power class 1 to power class 3 or vice versa, without switching to power class 2 first. Antenna 341 and transceiver 342 may be configured to utilize the different power transmission modes to transmit and/or receive signals.

An effective coverage area of an access node (e.g., access node 310 or 320) may be limited by an amount of power available to a wireless device, enabling wireless devices capable of utilizing high-power transmission modes to communicate with access nodes from a longer distance than standard-power wireless devices. In other words, effective coverage areas of access nodes 310, 320 can change dynamically based on a transmit power level of uplink transmissions 351, 352, 353, 354. Consequently, real-time adjustment of the power classes of wireless devices can be performed by network operators to increase the effective coverage area of their access nodes, enabling more users to use a given access node. For example, to enable communication with access node 320 from a long distance (such as an edge of a coverage area), wireless device 340 may be configured to transmit uplink transmissions 351 utilizing a high-powered transmission mode such as power class 1. Alternatively, to enable communication with access node 310 from a short distance, wireless device 340 may be configured to transmit uplink transmissions to access node 310 utilizing a standard-power transmission mode such as power class 3. In some embodiments, controlling the transmit power levels or changing the power classes of wireless device 340 may be performed by setting a maximum uplink transmit power value allowed by the serving access node (e.g., access node 310 or 320) to be equal to a standard maximum uplink transmit power value, and broadcasting the maximum uplink transmit power value to the wireless device via, for example, a system information message.

Figure 4:
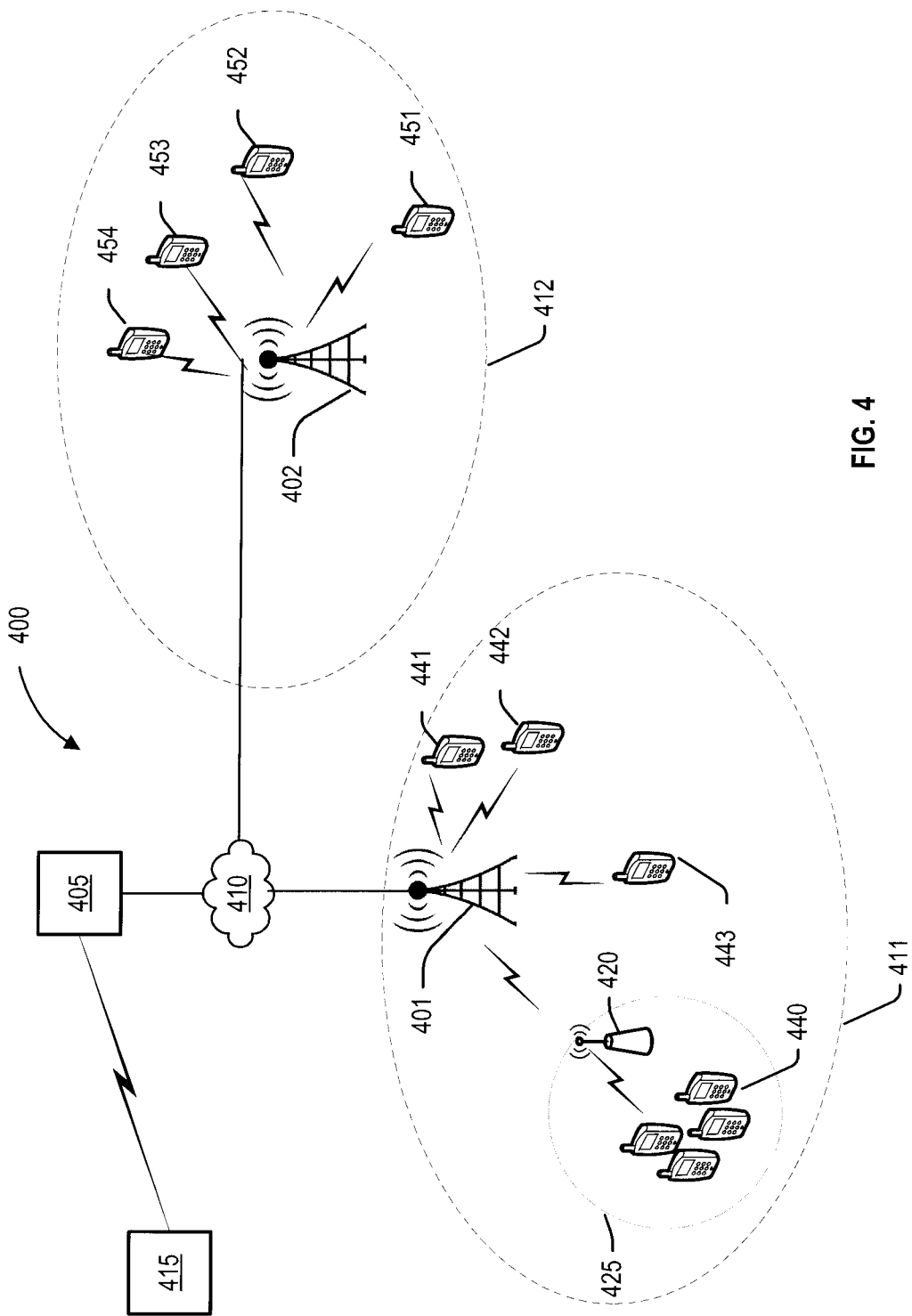
FIG. 4 depicts an exemplary system for wireless communication that is connected to an emergency alert system, in accordance with the disclosed embodiments.

FIG. 4 depicts an exemplary system for wireless communication that is coupled to an emergency alert system, in accordance with the disclosed embodiments. Wireless communication system 400 may include an element management system 405 that is connected, through a wireless or wired network 410, to one or more access nodes. Element management system 405 may represent a control system that controls access nodes in a wireless network. For example, element management system 405 may be an embodiment of, or a part of, control node 104 shown in FIG. 1. Element management system 405 may include a processor, a memory configured to store data, and a communication interface configured to communicate with access nodes and/or other devices or systems. Element management system 405 may include other hardware and/or software components.

In the system depicted in FIG. 4, two access nodes 401 and 402 are shown, although more or fewer access nodes may be included. Each of access nodes 401 and 402 may be configured to deploy a wireless radio air interface or a wireless network that has a coverage area 411 and 412, respectively. Each of access nodes 401 and 402 may be an embodiment of access nodes 110 and 210, 310, and 320. Each of access nodes 401 and 402 may serve one or more end-user wireless devices, directly or indirectly through a relay node. In the embodiment shown in FIG. 4, access node 401 serves a plurality of directly connected end-user wireless devices 441, 442, and 443, as well as a plurality of indirectly connected end-user wireless devices 440 through a relay node 420. Relay node 420 may be an embodiment of relay nodes 120, 130, 221, and/or 230. Relay node 420 may deploy a wireless radio air interface over a coverage area 425. Access node 402 may serve a plurality of directly connected end-user wireless devices 451, 452, 453, and 454. Both of access nodes 401 and 402 may be connected to element management system 405 through network 410. Element management system 405 may communicate with access nodes 401 and 402, and may be configured to control the setting of access node 401 and 402. The setting of access nodes 401 and 402 may include the setting of the frame configuration for access nodes 401 and 402.

As shown in FIG. 4, element management system 405 may be connected with an emergency alert system 415. Emergency alert system 415 may be a private or public emergency alert system, such as an emergency alert system operated by a federal agency, a state agency, or a local agency (such as a police department). Emergency alert system 415 may send messages to element management system 405 in the event of an emergency related to, e.g., weather, natural disaster, public safety, and/or homeland security. The messages sent from emergency alert system 415 to element management system 405 may inform element management system 405 of the nature, time, and place of the emergency event that has occurred. The message may be sent to element management system 405 from emergency alert system 415 before, during, or after the occurrence of the emergency event. Upon receiving the messages from emergency alert system 415, element management system 405 may send messages to one or more access nodes 401 and 402 to instruct the one or more access nodes 401 and 402 to switch frame configurations from a first frame configuration to a second frame configuration that has more uplink subframes than the first frame configuration.

For example, if a message received from emergency alert system 415 indicates that an emergency event (e.g., an earthquake, tornado, hurricane, flood, snow storm) has occurred within or adjacent to coverage area 411, element management system 405 may send a message to access node 401 to instruct access node 401 to switch frame configuration. When access node 401 receives the message from element control system 405, it may determine that a trigger for switching the frame configuration has been received or established. In response, access node 401 may switch the frame configuration from a first frame configuration (e.g., frame configuration number 1 or 2 shown in FIG. 10), through which access node 401 is currently providing wireless services to end-user wireless devices under normal operation conditions, to a second frame configuration (e.g., frame configuration number 0 or 6 shown in FIG. 10) such that more resources (e.g., subframes) are allocated for uplink transmission. As a result, uplink communication quality for the end-user wireless devices within coverage area 411 may be improved during the emergency event.

As another example, if the message received from emergency alert system 415 indicates that the emergency event has occurred within or adjacent to the coverage area 412, element management system 405 may send a message to access node 402 to instruct access node 402 to switch the frame configuration that is being used by access node 402. When access node 402 receives the message from element control system 405, it may determine that a trigger for switching the frame configuration has been received or established. In response, access node 402 may switch from a first frame configuration (e.g., frame configuration number 1 or 2 shown in FIG. 10), through which access node 402 is currently providing wireless services to end-user wireless devices under normal operation conditions, to a second frame configuration (e.g., frame configuration number 0 or 6 shown in FIG. 10) such that more resources (e.g., subframes) are allocated for uplink transmission. As a result, uplink communication quality for the end-user wireless devices within coverage area 412 may be improved during the emergency event.

As yet another example, if the message received from emergency alert system 415 indicates that the emergency event has occurred neither within coverage area 411 nor within coverage area 412, but adjacent to both coverage area 411 and coverage area 412, element management system 405 may send messages to both access nodes 401 and 402 to instruct access nodes 401 and 402 to switch frame configurations. When access node 401 and 402 receive the messages from element control system 405, access node 401 and 402 may determine that a trigger for switching the frame configuration has been received or established. In response, each of access nodes 401 and 402 may switch from a first frame configuration (e.g., frame configuration number 1 or 2 shown in FIG. 10), through which access nodes 401 and 402 are currently providing wireless services to end-user wireless devices under normal operation conditions, to a second frame configuration (e.g., frame configuration number 0 or 6 shown in FIG. 10) such that more resources (e.g., subframes) are allocated for uplink transmission. As a result, uplink communication quality for the end-user wireless devices within coverage area 412 may be improved during the emergency event.

Referring to FIG. 4, access nodes 401 and 402 may or may not use the same frame configuration under the normal operation conditions. For example, access node 401 may implement frame configuration number 1 shown in FIG. 10 under normal operation conditions, whereas access node 402 may implement frame configuration number 2 shown in FIG. 10 under normal operation conditions. When switching frame configurations, the second frame configurations for access nodes 401 and 402 may or may not be the same. For example, access node 401 may switch from a first frame configuration (e.g., frame configuration number 1) to a second frame configuration (e.g., frame configuration number 0). Access node 402 may switch from a different first frame configuration (e.g., frame configuration number 2) to a different second frame configuration (e.g., frame configuration number 6).

During the emergency event, end-user wireless devices (e.g., 441, 442, 443, 440, 451, 452, 453, and 454) may operate in an emergency mode (e.g., "911" mode in the United States). In some embodiments, operating in the emergency mode may enable the wireless devices to temporarily increase the uplink transmission power (e.g., from 23 dB to 30 dB). Increasing the uplink transmission power may enable the wireless devices located at remote areas, such as edges of coverage areas 411 and 412, to better reach the access nodes. However, if more resources (e.g., subframes) are not allocated for uplink transmission between the wireless devices and the access nodes, the uplink transmission channels may still be congested due to the abruptly increased uplink requests during an emergency event. By dynamically switching the frame configuration to a new frame configuration that has more resources (e.g., subframes) allocated to uplink transmission, the uplink communication quality may be improved for the wireless devices during the emergency event.

The trigger for switching frame configuration may not be limited to the message received from element management system 405. Access nodes 401 and 402 may determine that a trigger for switching frame configuration is reached or established based on data received from the wireless devices. For simplicity, access node 401 is used as an example in below discussions. It is understood that the same operations may be performed by access node 402.

For example, when the wireless devices are operating in the emergency mode (e.g., "911" mode in the United States), access node 401 may receive messages or data from the wireless devices indicating that the wireless devices are operating in the emergency mode. Access node 401 may determine that the number of wireless devices operating in emergency mode has exceeded a predetermined threshold number (e.g., 10, 20, 30, or any other suitable number). As a result, access node 401 may switch the frame configuration from a first frame configuration, with which access node 401 is currently providing wireless communication services to wireless devices under normal operation conditions, to a second frame configuration. The second frame configuration may include more or increased amount of uplink resources (e.g., subframes) than the first frame configuration. Wireless devices may transmit uplink data to access node 401 and receive downlink data from access node 401 according to the second frame configuration. With the second frame configuration, uplink transmission quality may be improved between access node 401 and the wireless devices served by access node 401.

In some embodiments, when an emergency event occurs, wireless devices may send requests to access node 401 for switching the frame configuration such that the currently used frame configuration is switched to a frame configuration that has more uplink subframes. Access node 401 may determine that the number of wireless devices requesting switch of the frame configuration exceeds a predetermined threshold number (e.g., 10, 20, 30, or any other suitable number). Subsequently, access node 401 may switch the frame configuration from a first frame configuration to a second frame configuration, such that more resources (e.g., subframes) are allocated for uplink transmission.

Figure 5:
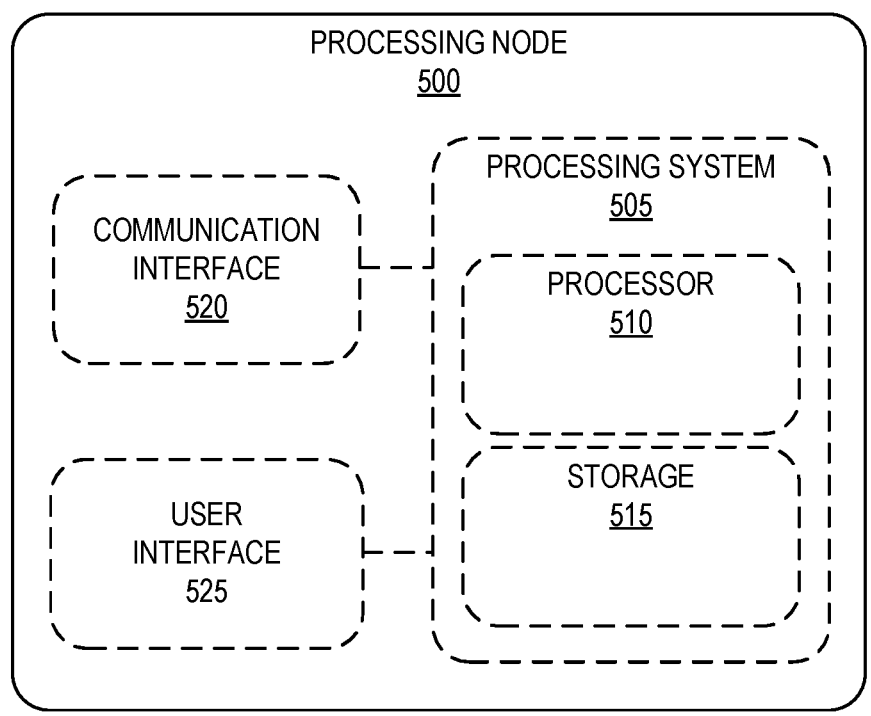
FIG. 5 depicts an exemplary processing node, in accordance with the disclosed embodiments.

FIG. 5 depicts an exemplary processing node 500, which may be configured to perform resource scheduling or allocation functions, including the methods and operations disclosed herein for dynamically setting frame configurations for access nodes. In some embodiments, processing node 500 may be included in an access node, such as access node 110, 210, 310, 320, 401, or 402. For example, processing node 500 may be included in a scheduler (e.g., scheduler 211) included in the access node and configured to perform resource scheduling functions, including dynamically setting the frame configuration for the access node. In some embodiments, processing node 500 may be included in controller node 104 or element management system 405, and may be configured for controlling the access nodes, including setting frame configurations for the access nodes.

Processing node 500 may be configured for scheduling resources for relay nodes, wireless devices, and/or access nodes in a wireless network. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing resource scheduling operations described herein. Processor 510 may be a microprocessor and may include hardware circuitry and/or embedded codes configured to retrieve and execute software stored in storage device 515.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as touch screens, buttons, displays, speakers, etc. Processing node 500 may further include other components such as a power management unit, a control interface unit, etc.

Figure 6:
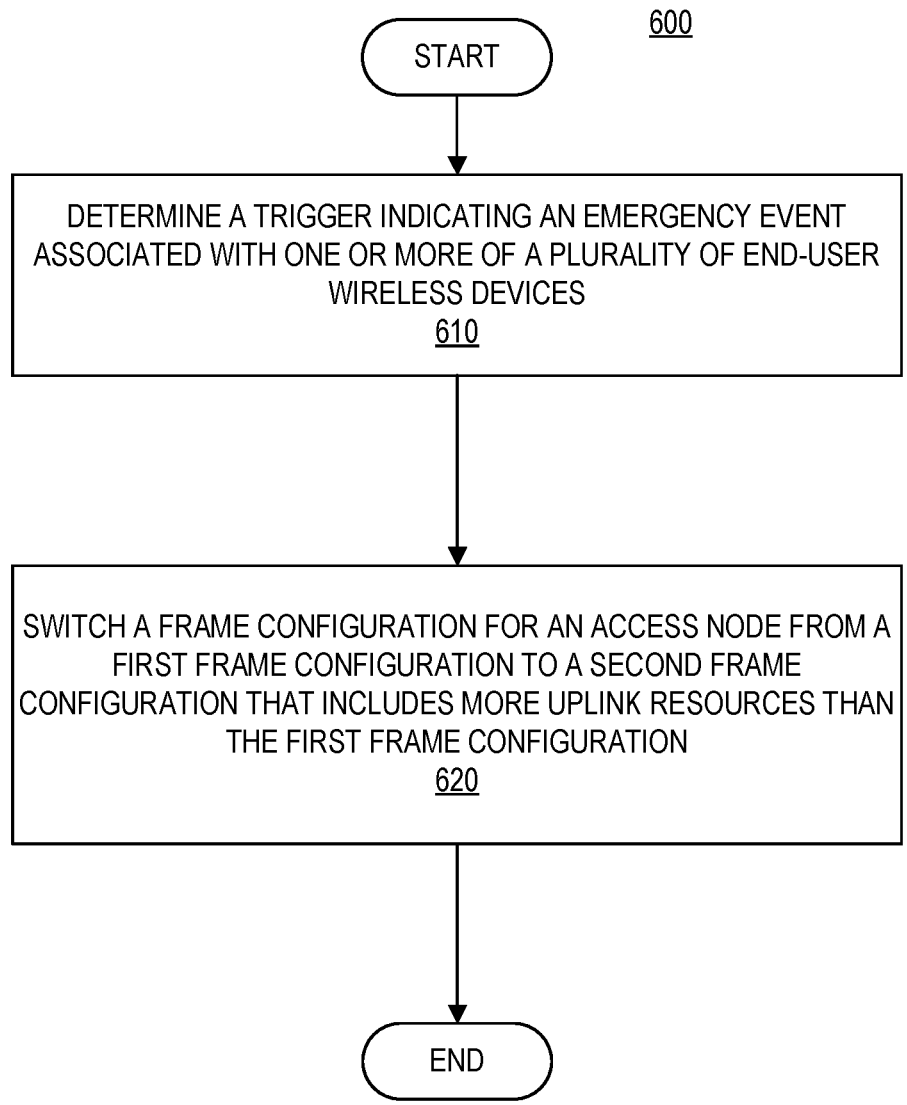
FIG. 6 depicts an exemplary method for dynamically setting a frame configuration in a wireless network in an emergency event, in accordance with the disclosed embodiments.

The disclosed methods for allocating uplink resources, including dynamically setting the frame configuration for an access node, are discussed further below. FIG. 6 illustrates an exemplary method for dynamically setting the frame configuration for an access node, such as access node 110, 210, 310, 320, 401, or 402. Method 600 may be performed by any suitable processor discussed herein, for example, a processor included in access node 110, 210, 310, 320, 401, or 402, processor 510 included in processing node 500, a processor included in control node 104, or a processor included in element management system 405. For discussion purposes, as an example, method 600 is described as being performed by a processor included in access node 401.

Figure 7:
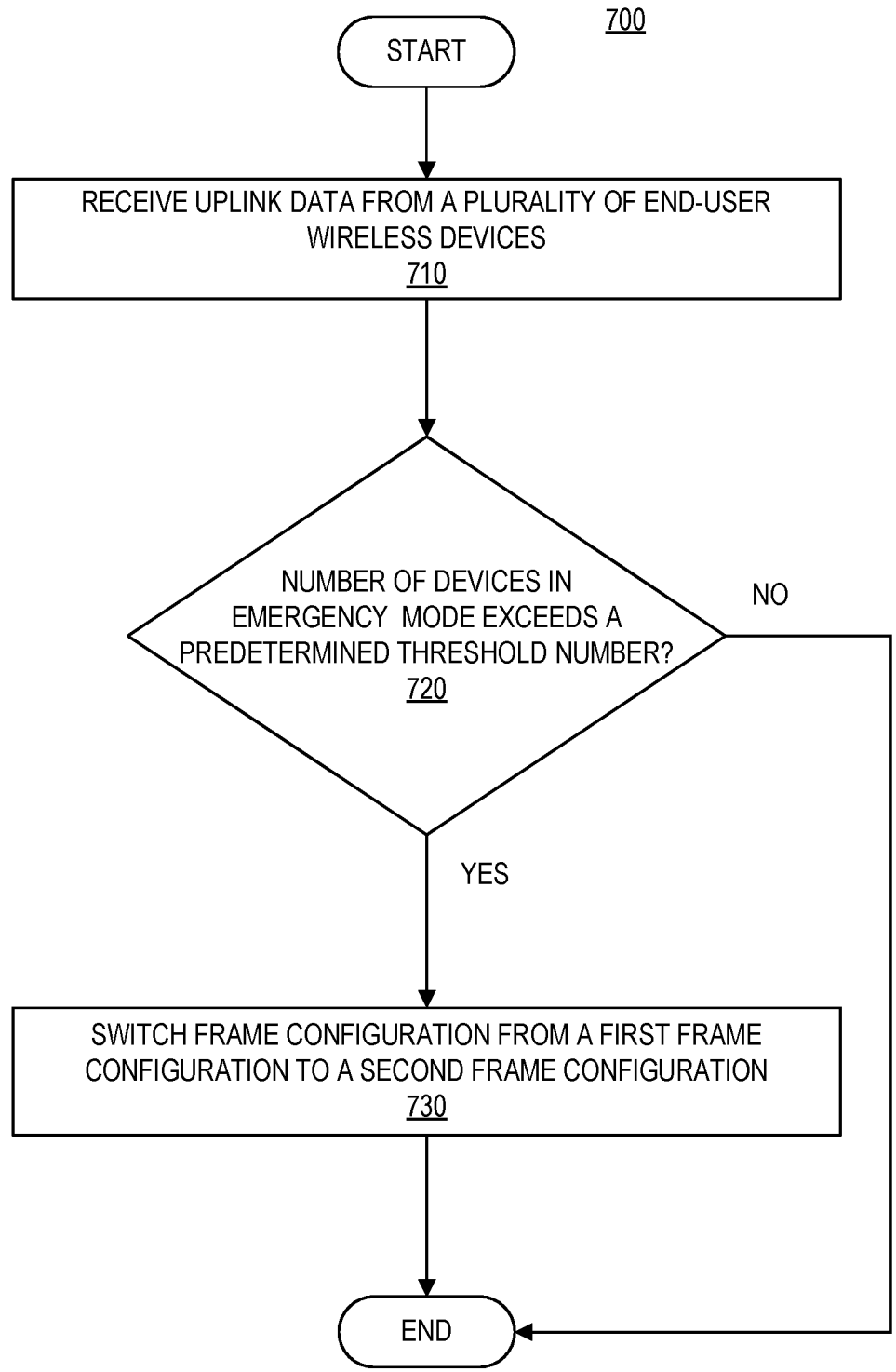
FIG. 7 depicts an exemplary method for determining a trigger to switch the frame configuration in the method depicted in FIG. 6, in accordance with the disclosed embodiments.
Figure 8:
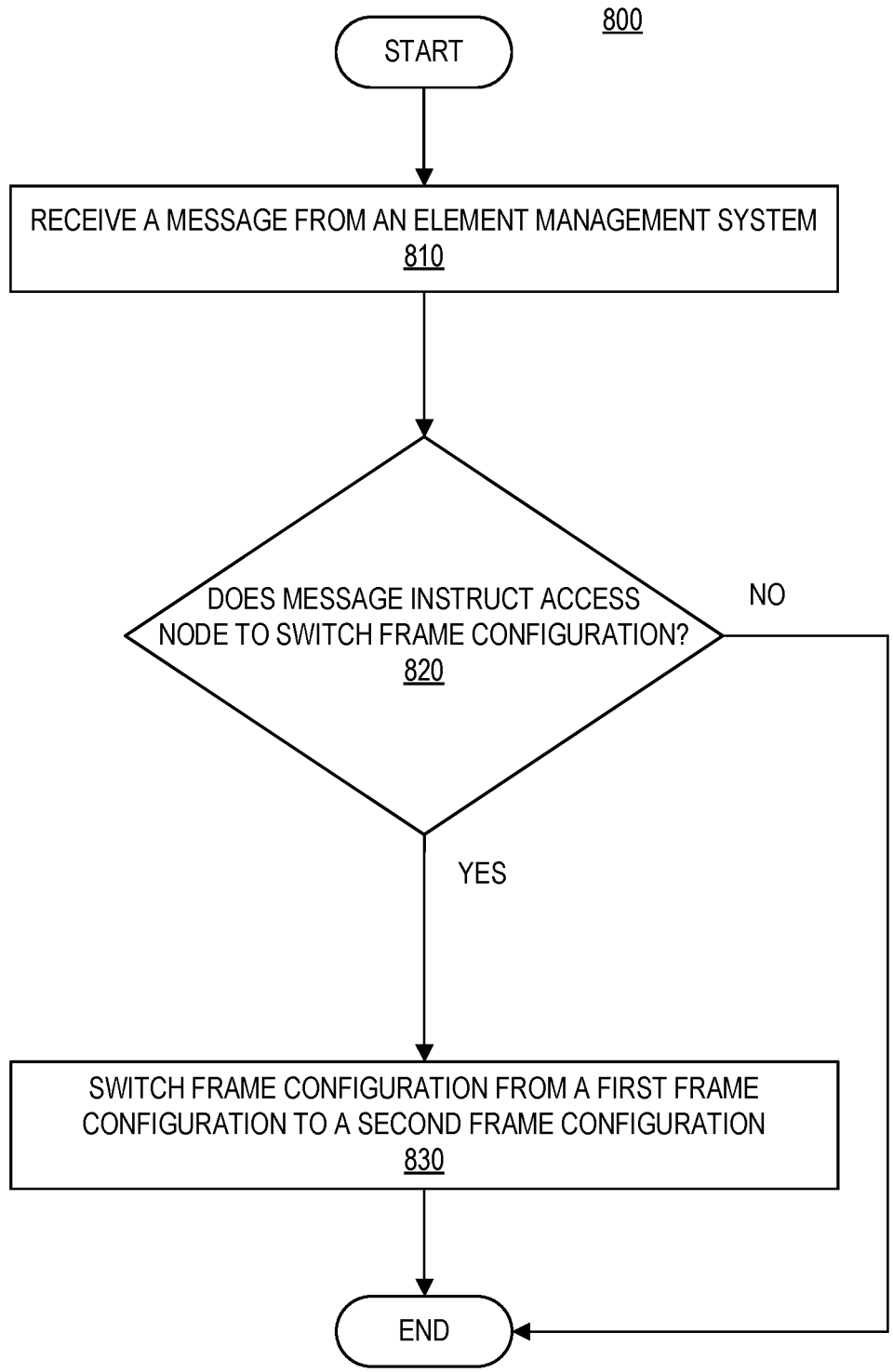
FIG. 8 depicts another exemplary method for determining a trigger to switch the frame configuration in the method depicted in FIG. 6, in accordance with the disclosed embodiments.
Figure 9:
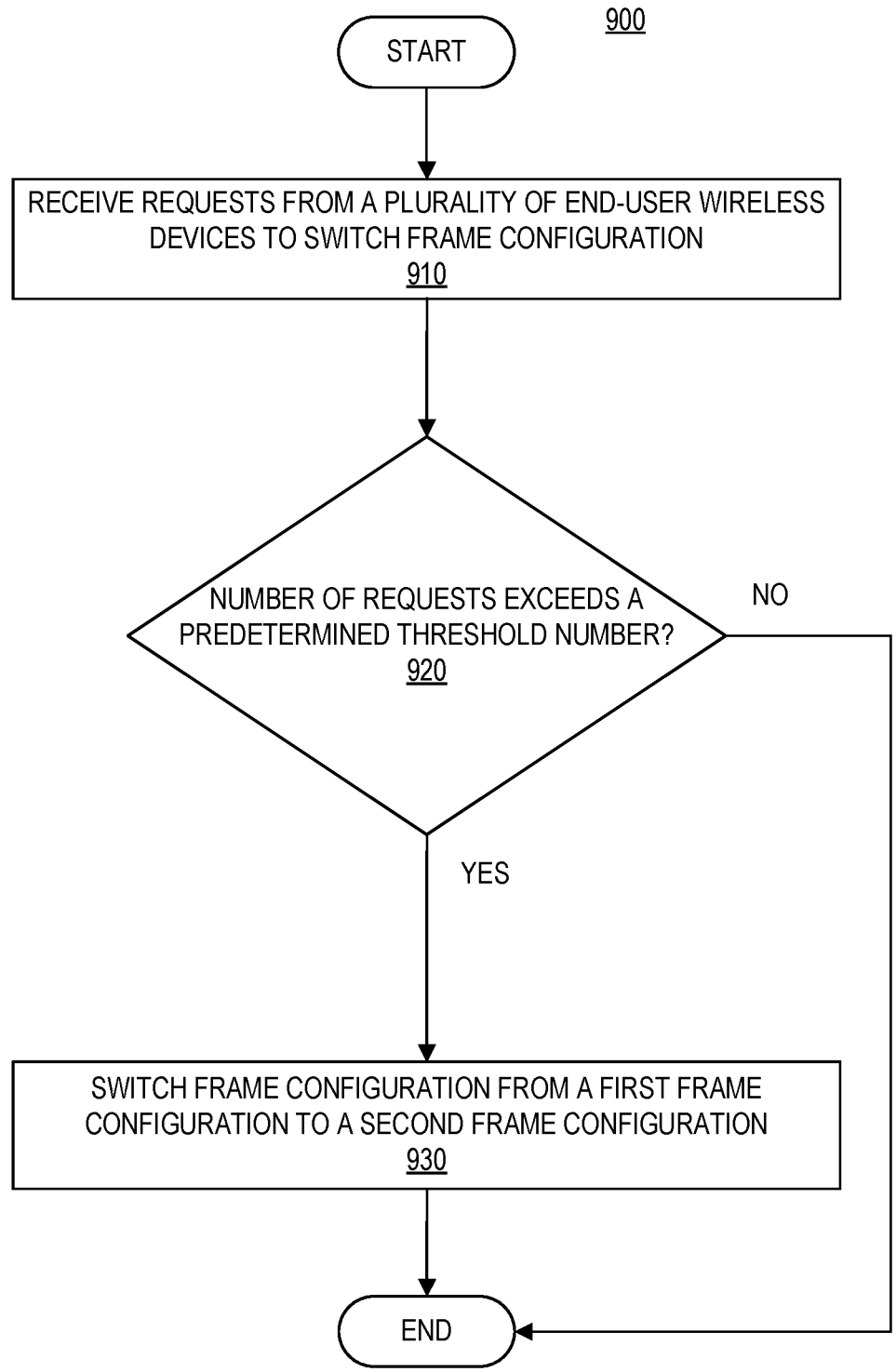
FIG. 9 depicts another exemplary method for determining a trigger to switch the frame configuration in the method depicted in FIG. 6, in accordance with the disclosed embodiments.

Method 600 may include determining a trigger indicating an emergency event associated with one or more of a plurality of end-user wireless devices (step 610). The trigger, when determined to have been established, received, or satisfied, may cause the access node to switch a frame configuration. The trigger may be determined in various manners and by various devices or systems, such as by an access node, element management system 405, and/or control node 104. FIGS. 7-9 depict exemplary methods for determining the trigger.

FIG. 6 depicts an exemplary method for determining the trigger based on the number of wireless devices operating in an emergency mode. Method 700 may be implemented by any of the access nodes, element management system 405, or control node 104. For discussion purposes, as an example, method 700 is illustrated as being performed by access node 401. Access node 401 may receive uplink data from a plurality of end-user wireless devices (step 710). Access node 401 may determine to switch the frame configuration based on the uplink data received from the wireless devices. For example, when wireless devices are operating in an emergency mode (e.g., "911" mode in the United States) in the event of an emergency, wireless devices may send uplink messages or data to access node 401 indicating that the wireless devices are operating in an emergency mode. Access node 401 may determine the number of wireless devices that are operating in the emergency mode. Access node 401 may determine whether the number of wireless devices operating in the emergency mode exceeds a predetermined threshold number (e.g., 10, 20, 30, or any other suitable number) (step 720). When access node 401 determines that the number of wireless devices operating in the emergency mode exceeds the predetermined threshold number (Yes, step 720), access node 401 may determine that a trigger for switching the frame configuration has been established, received, or satisfied, and may switch the frame configuration from a first frame configuration to a second frame configuration (step 730). The number of wireless devices operating in emergency mode exceeding the predetermined threshold number may be an embodiment of the trigger. When access node 401 determines that the number of wireless devices operating in the emergency mode does not exceed the predetermined threshold number (No, step 720), access node 401 may not switch the frame configuration.

In some embodiments, in the method shown in FIG. 7, if the wireless devices have not already increased their uplink transmission power when operating in the emergency mode, after access node 401 determines that the number of wireless devices operating in emergency mode exceeds the predetermined threshold number (thereby triggering the frame configuration switch), access node 401 may also send a message to the wireless devices within coverage area 411, instructing or causing the wireless devices to increase the uplink transmission power, e.g., from within a range of 23 dB to 26 dB to within a range of 29 dB to 30 dB.

FIG. 8 depicts an exemplary method for determining the trigger based on a message received from element management system 405. Method 800 may be implemented by any of the access nodes. For discussion purposes, as an example, method 800 is illustrated as being performed by access node 401. When an emergency event occurs within or adjacent to coverage area 411, element management system 405 may receive an alert message from emergency alert system 415 indicating that the emergency event is about to occur, is occurring, or has occurred within or adjacent to coverage area 411. Element management system 405 may send a message to access node 401 informing access node 401 that an emergency event has occurred within coverage area 411, and instructing access node 401 to switch frame configuration from a first frame configuration to a second frame configuration that has more or increased amount of uplink resources (e.g., subframes) than the first frame configuration.

As shown in FIG. 8, access node 401 may receive a message from element management system 405 (step 810). Access node 401 may determine whether the message instructs access node 401 to switch the frame configuration (step 820). When access node 401 determines that the message includes an instruction to switch the frame configuration (Yes, step 820), access node 401 may switch the frame configuration from the first frame configuration that is currently used by access node 401 under normal operation conditions for providing wireless services to wireless devices, to the second frame configuration that has more uplink resources than the first frame configuration (step 830). The message with the frame configuration instruction may be an embodiment of the trigger. When access node 401 determines that the message does not include an instruction to switch frame configuration (No, step 820), access node 401 may not switch the frame configuration.

In some embodiments, in the method shown in FIG. 8, after access node 401 determines that the message received from element management system 405 includes an instruction for access node 401 to switch the frame configuration, access node 401 may also send a message to the wireless devices within coverage area 411, instructing or causing the wireless devices to increase the uplink transmission power, e.g., from within a range of 23 dB to 26 dB to within a range of 29 dB to 30 dB.

FIG. 9 depicts an exemplary method for determining the trigger based on a number of requests for switching frame configuration received from the wireless devices. Method 900 may be implemented by any of the access nodes. For discussion purposes, as an example, method 900 is illustrated as being performed by access node 401. Access node 401 may receive requests from a plurality of end-user wireless devices to switch the frame configuration (step 910). Access node 401 may determine to switch frame configuration based on the number of requests for switching the frame configuration. The requests received from the wireless devices may indicate that an emergency event is occurring, is about to occur, or has occurred in coverage area 411 where the wireless devices are located. The requests from the wireless devices may calls for access node 401 to switch the frame configuration such that a new frame configuration having more uplink resources (e.g., subframes) than the currently used frame configuration is adopted for the communication between access node 401 and the wireless devices, such that uplink transmission quality is improved. Access node 401 may determine whether the number of requests received from the wireless devices exceeds a predetermined threshold number (step 920). When access node 401 determines that the number of requests exceeds the predetermined threshold number (e.g., 10, 20, 30, or any other suitable number), access node 401 may switch the frame configuration from a first frame configuration that is being used for wireless communication, to a second frame configuration that has more uplink resources than the first frame configuration (step 930). The number of requests exceeding the predetermined threshold number may be another embodiment of the trigger. For example, the first frame configuration may be used for normal operation conditions, and the second frame configuration may be used for emergency events, which may include more uplink subframes than the first frame configuration. More uplink subframes may improve the uplink transmission quality for the wireless devices. If access node 401 determines that the number of requests does not exceed the predetermined threshold number (No, step 920), access node 401 may not switch the frame configuration.

In some embodiments, in the method shown in FIG. 9, if the wireless devices have not already increased the uplink transmission power when sending the requests to access node 401, after access node 401 determines that the number of requests for switching the frame configuration exceeds the predetermined threshold number (thereby triggering the frame configuration switch), access node 401 may also send a message to the wireless devices within coverage area 411, instructing or causing the wireless devices to increase the uplink transmission power at the wireless devices, e.g., from within a range of 23 dB to 26 dB to within a range of 29 dB to 30 dB. The message to the wireless devices may be sent before or after the switch of the frame configuration from the first frame configuration to the second frame configuration.

Referring back to FIG. 6, after determining the trigger for switching frame configuration, e.g., by an access node, element management system 405, and/or control node 104, method 600 may include switching a frame configuration for an access node from a first frame configuration to a second frame configuration that includes more uplink resources than the first frame configuration (step 620). Step 620 may be performed by any of access nodes, element management system 405, and/or control node 104. When performed by element management system 405 and/or control node 104, the step of switching a frame configuration may include causing the switch of a frame configuration at the access node from a first frame configuration to a second frame configuration. Step 620 is similar to steps 730, 830, and 930 discussed above.

In some embodiments, the first frame configuration may be any one of frame configuration numbers 1-5 shown in FIG. 10, and the second frame configuration may be any one of frame configuration numbers 0 and 6. In some embodiments, the second frame configuration may be any frame configuration that has more uplink subframes than the first frame configuration, such that quality of uplink transmission from wireless devices to access node 401 is improved with the second frame configuration during an emergency event.

In some embodiments, the trigger for switching the frame configuration from the first frame configuration to the second frame configuration may be a combination of any of the embodiments of the trigger discussed above in connection with FIGS. 7-9. For example, the trigger for switching the frame configuration from the first frame configuration to the second frame configuration may be a combination of a number of wireless devices operating in the emergency mode exceeding the predetermined threshold number, as shown in FIG. 7, and a message having been received from element management system 405 instructing an access node to switch frame configuration, as shown in FIG. 8. As another example, the trigger for switching the frame configuration from the first frame configuration to the second frame configuration may be a combination of a number of wireless devices operating in the emergency mode exceeding a first predetermined threshold number, as shown in FIG. 7, and a number of requests exceeding a second predetermined threshold number having been received, as shown in FIG. 9. As yet another example, the trigger for switching the frame configuration from the first frame configuration to the second frame configuration may be a combination of a message having been received from element management system 405 instructing an access node to switch frame configuration, as shown in FIG. 8, and a number of requests exceeding a predetermined threshold number having been received, as shown in FIG. 9.

Method 600 shown in FIG. 6 may include additional operations. For example, in some embodiments, after switching the frame configuration from the first frame configuration to the second frame configuration with more uplink subframes, access node 401 may send a message to the wireless devices within coverage area 411, notifying the wireless device about the switch, such that the wireless devices can use the second frame configuration to transmit data with access node 401. In some embodiments, the message may also include an instruction to the wireless device to increase the uplink transmission power. The wireless devices may increase their uplink transmission power upon receiving the message from access node 401.

In some embodiments, after the frame configuration is switched from the first frame configuration (under normal operation conditions) to the second frame configuration (under emergency operation conditions), access node 401 may switch the second frame configuration back to the first frame configuration when a second trigger is determined. The second trigger for switching back to the first frame configuration from the second frame configuration may be that a message is received indicating that the emergency event is over, or that it is not necessary to use the second frame configuration (hence not necessary to allocate the amount of subframes included in the second frame configuration for uplink transmission). For example, in some embodiments, when the emergency event is over, or the level of emergency alert has been reduced to a non-emergency level, emergency alert system 415 may send a message to element management system 405. Subsequently, element management system 405 may send a message to access node 401 informing access node 401 that there is no need to provide the wireless services using the second frame configuration, or instruct access node 401 to switch back to the first frame configuration. Access node 401 may then switch from the second frame configuration back to the first frame configuration for normal operation conditions.

In some embodiments, the second trigger may be that a predetermined time period has lapsed since the switch from the first frame configuration to the second frame configuration. For example, after switching from the first frame configuration to the second frame configuration during an emergency event, if a predetermined time period, such as 10 hours, 1 day, 2 days, 1 week, 2 weeks, etc., has lapsed, access node 401 may switch back to the first frame configuration from the second frame configuration. In some embodiments, the predetermined time period may be initially determined or set by access node 401. It is understood that the predetermined time period may be determined or set by other elements in a network, such as element management system 405.

In some embodiments, the predetermined time period initially set by the access node 401 may be dynamically adjusted based on various information, including, for example, messages received from element management system 405 associated with the level of emergency, data received from wireless devices within coverage area 411 that may indicate the number of wireless devices operating in an emergency mode (e.g., making emergency calls). For example, if at the end of the initially set predetermined time period, the number of wireless devices operating in an emergency mode has not reduced below a predetermined threshold number (e.g., 10, 20, 30, etc.), or that the amount of uplink transmission data is greater than a predetermined amount, or that the uplink transmission congestion level is greater than a predetermined level, access node 401 may extend the initially set predetermined time period, for example, by 1 day, 2 days, etc. If, at the end of the initially set predetermined time period, the number of wireless devices operating in the emergency mode has reduced below a predetermined threshold number, or the amount of uplink transmission data is lower than a predetermined amount, or that the uplink transmission congestion level is below a predetermined level, access node 401 may switch from the second frame configuration back to the first frame configuration without extending the initially set predetermined time period.

In some embodiments, the second trigger may be that a number of wireless devices operating in the emergency mode has reduced below a predetermined threshold number. For example, if access nod 401 determines, based on the uplink data from the wireless devices within coverage area 411, that the number of wireless devices operating in the emergency mode has reduced below a predetermined threshold number (e.g., 10, 20, 30, 50, etc.), access node 401 may switch back to the first frame configuration from the second frame configuration.

In some embodiments, the second trigger may include a combination of the above-mentioned embodiments of the second trigger. For example, the second trigger may be a combination of the lapse of the predetermined time period and that the number of wireless device operating in the emergency mode having been reduced below a predetermined threshold number.

The disclosed systems and methods may switch the frame configuration of an access node between a first frame configuration and a second frame configuration, based on status of an emergency event. Therefore, the disclosed systems and methods may dynamically set the frame configuration of an access node, whereas a conventional access node or network may implement a fixed frame configuration that is not changed in response to the occurrence of an emergency event. Dynamically setting the frame configuration such that a frame configuration having more uplink subframes is used during an emergency event may improve the uplink transmission quality, thereby reducing or eliminating the congestion in the uplink channels caused by an abrupt increase in the uplink transmission demands from the wireless devices located in the areas affected by the emergency event. The disclosed systems and methods may therefore respond to the occurrence of an emergency event in a flexible manner, which may improve the efficiency and quality of wireless communication in an area affected by an emergency event.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for dynamically setting a frame configuration in a wireless network in an emergency event, the system comprising:
an access node configured to deploy a first radio air interface having a first frame configuration;
a plurality of end-user wireless devices attached to the first radio air interface; and
a processor configured to:
receive uplink messages from the plurality of end-user wireless devices, at least some of the uplink messages indicating operation of each corresponding end-user wireless device in an emergency mode;
determine a trigger indicating the emergency event associated with the plurality of end-user wireless devices, wherein the trigger comprises detecting that a number of the end-user wireless devices operating in the emergency mode exceeds a first predetermined threshold number and determining that more than a second predetermined threshold number of requests is received from the plurality of end-user wireless devices for switching the frame configuration;
in response to determining the trigger indicating the emergency event, dynamically switch the frame configuration for the access node from the first frame configuration to a second frame configuration, the second frame configuration including more uplink subframes than the first frame configuration; and
in response to determining the trigger indicating the emergency event, send a broadcast message to the plurality of end-user wireless devices instructing the end-user wireless devices to increase uplink transmission power, thereby improving uplink transmission quality for the plurality of end-user wireless devices attached to the first radio air interface.

2. The system of claim 1, wherein determining the trigger further includes receiving a message from an element management system, the message indicating the emergency event.

3. The system of claim 1, wherein operating in the emergency mode includes making emergency calls or sending messages relating to the emergency event.

4. The system of claim 1, wherein the frame configuration is a frame configuration for Long Term Evolution (LTE) time division duplex (TDD).

5. The system of claim 1, wherein one or more of the plurality of end-user wireless devices includes a high-powered wireless device (HPUE), the HPUE being capable to transmit at a higher power level than a standard-powered wireless device.

6. The system of claim 1, wherein the processor is further configured to detect a second trigger and switch from the second frame configuration to the first frame configuration.

7. The system of claim 6, wherein detecting the second trigger includes determining that a message is received instructing the access node to switch back from the second frame configuration to the first configuration.

8. The system of claim 6, wherein detecting the second trigger includes determining that a predetermined time period has lapsed from when the frame configuration is switched from the first frame configuration to the second frame configuration.

9. A method for dynamically setting a frame configuration in a wireless network in an emergency event, the method comprising:
receiving, by a processor, uplink messages from a plurality of end-user wireless devices, at least some of the uplink messages indicating operation of each corresponding end-user wireless device in an emergency mode;
determining, by the processor, a trigger indicating the emergency event associated with the plurality of end-user wireless devices, wherein the trigger comprises detecting that a number of end-user wireless devices operating in an emergency mode exceeds a first predetermined threshold number and determining the trigger further includes determining that a second predetermined threshold number of requests is received from the end-user wireless devices for switching the frame configuration;
in response to determining the trigger indicating the emergency event, dynamically switching, by the processor, the frame configuration for an access node from a first frame configuration to a second frame configuration, the second frame configuration including more uplink subframes than the first frame configuration; and
in response to determining the trigger indicating the emergency event, instructing, by the processor sending a broadcast message, the plurality of end-user wireless devices to increase uplink transmission power, thereby improving uplink transmission quality for the end-user wireless devices.

10. The method of claim 9, wherein determining the trigger further includes receiving a message from an element management system, the message indicating the emergency event.

11. The method of claim 9, wherein operating in the emergency mode includes making emergency calls or sending messages relating to the emergency event.

12. The method of claim 9, wherein the frame configuration is a frame configuration for Long Term Evolution (LTE) time division duplex (TDD).

13. The method of claim 12, wherein the end-user wireless devices include a high-powered wireless device (HPUE), the HPUE being capable to transmit at a higher power level than a standard-powered wireless device.

14. The method of claim 9, further comprising detecting a second trigger and switching from the second frame configuration to the first frame configuration.

15. The method of claim 14, wherein detecting the second trigger includes determining that the number of end-user wireless devices operating in the emergency mode is below a predetermined threshold number.

16. A processing node for dynamically setting a frame configuration in a wireless network in an emergency event, the processing node being configured to perform operations comprising:
receiving, by a processor, uplink messages from a plurality of end-user wireless devices, at least some of the uplink messages indicating operation of each corresponding end-user wireless device in an emergency mode;
determining a trigger indicating the emergency event associated with the end-user wireless devices operating in the emergency mode, wherein the trigger comprises detecting that a number of end-user wireless devices operating in the emergency mode exceeds a first predetermined threshold number and determining the trigger further includes determining that a second predetermined threshold number of requests is received from the end-user wireless devices for switching the frame configuration;
in response to determining the trigger indicating the emergency event, switching the frame configuration for an access node from a first frame configuration to a second frame configuration, the second frame configuration including more uplink subframes than the first frame configuration; and
in response to determining the trigger indicating the emergency event, instructing, by the processor sending a broadcast message, the plurality of end-user wireless devices to increase uplink transmission power, thereby improving uplink transmission quality for the end-user wireless devices.

* * * * *